United States Patent
Kang et al.

(10) Patent No.: US 12,446,770 B2
(45) Date of Patent: Oct. 21, 2025

(54) APPARATUS, METHOD, AND PROGRAM FOR SEARCHING AND TRAINING PREFERRED RETINAL LOCUS OF PATIENT WITH VISUAL FIELD DAMAGE

(71) Applicants: THE ASAN FOUNDATION, Seoul (KR); NUNAPS INC., Seoul (KR); UNIVERSITY OF ULSAN FOUNDATION FOR INDUSTRY COOPERATION, Ulsan (KR)

(72) Inventors: Dong Wha Kang, Seoul (KR); Joo Yong Lee, Seoul (KR); Rak Kyeun Hong, Guri-si (KR); Yong Hwan Kim, Seoul (KR)

(73) Assignees: THE ASAN FOUNDATION, Seoul (KR); NUNAPS INC., Seoul (KR); UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 0 days.

(21) Appl. No.: 18/594,271

(22) Filed: Mar. 4, 2024

(65) Prior Publication Data
US 2024/0206721 A1    Jun. 27, 2024

Related U.S. Application Data

(63) Continuation of application No. PCT/KR2022/013047, filed on Aug. 31, 2022.

(30) Foreign Application Priority Data

Sep. 6, 2021 (KR) .......... 10-2021-0118306

(51) Int. Cl.
*A61B 3/024* (2006.01)
*A61B 3/00* (2006.01)
*A61B 5/11* (2006.01)

(52) U.S. Cl.
CPC ........... *A61B 3/024* (2013.01); *A61B 3/0091* (2013.01); *A61B 5/1114* (2013.01)

(58) Field of Classification Search
CPC ..... A61B 3/024; A61B 3/0091; A61B 5/1114; A61B 3/032; A61B 3/0025; A61B 3/0041; A61B 5/1104; A61F 9/00
(Continued)

(56) References Cited

U.S. PATENT DOCUMENTS 5,532,770 A * 7/1996 Schneider .............. G09B 23/28
                                                    351/205
8,337,019 B2   12/2012 Murray et al.
(Continued)

FOREIGN PATENT DOCUMENTS

EP    2148609 B1   12/2013
JP    2002-523183 A   7/2002
(Continued)

OTHER PUBLICATIONS

International Search Report issued in PCT/KR2022/013047; mailed Dec. 2, 2022.
(Continued)

*Primary Examiner* — Mohammed A Hasan
(74) *Attorney, Agent, or Firm* — Studebaker Brackett PLLC; Sang Yoon Kang, Esq.

(57) ABSTRACT

Provided are a device, method and program for searching and training a preferred retinal locus of a patient with visual field damage. The method comprises the steps of: providing first stimulation to a patient by means of a stimulation providing device linked to the device; receiving, from the patient, a response with respect to the first stimulation by means of the stimulation providing device; if the response is correct, analyzing the movement of the patient's head corresponding to the first stimulation; specifying a preferred
(Continued)

Preferred retinal locus (PRL)

retinal locus on the basis of the analysis result; performing training associated with the patient's central fixation; and performing training associated with reinforcement of the patient's preferred retinal locus.

7 Claims, 10 Drawing Sheets

(58) Field of Classification Search
USPC .......................................................... 351/246
See application file for complete search history.

(56) References Cited

U.S. PATENT DOCUMENTS

| | | |
|---|---|---|
| 10,386,645 B2 | 8/2019 | Abou Shousha |
| 10,389,989 B2 | 8/2019 | Abou Shousha et al. |
| 10,409,071 B2 | 9/2019 | Abou Shousha et al. |
| 10,444,514 B2 | 10/2019 | Abou Shousha et al. |
| 10,481,402 B1 | 11/2019 | Abou Shousha et al. |
| 10,485,421 B1 | 11/2019 | Abou Shousha et al. |
| 10,531,795 B1 | 1/2020 | Abou Shousha |
| 10,666,918 B2 | 5/2020 | Abou Shousha |
| 10,674,127 B1 | 6/2020 | Abou Shousha |
| 10,742,944 B1 | 8/2020 | Abou Shousha |
| 10,802,288 B1 | 10/2020 | Abou Shousha et al. |
| 10,955,678 B2 | 3/2021 | Abou Shousha et al. |
| 11,039,745 B2 | 6/2021 | Abou Shousha et al. |
| 11,102,462 B2 | 8/2021 | Abou Shousha |
| 11,147,448 B2 | 10/2021 | Lee |
| 11,806,079 B2* | 11/2023 | Yam .................. A61B 3/113 |
| 2010/0195051 A1 | 8/2010 | Murray et al. |
| 2013/0215147 A1 | 8/2013 | Hilkes et al. |
| 2018/0104106 A1* | 4/2018 | Lee .................. H04N 23/68 |
| 2018/0116900 A1 | 5/2018 | Rifai et al. |
| 2019/0094552 A1 | 3/2019 | Shousha |
| 2019/0200858 A1* | 7/2019 | Yam .................. A61B 3/032 |
| 2019/0222817 A1 | 7/2019 | Abou Shousha et al. |
| 2019/0223716 A1 | 7/2019 | Abou Shousha et al. |
| 2019/0227327 A1 | 7/2019 | Abou Shousha et al. |
| 2019/0298166 A1 | 10/2019 | Smith et al. |
| 2019/0379869 A1 | 12/2019 | Abou Shousha |
| 2019/0391398 A1 | 12/2019 | Abou Shousha et al. |
| 2021/0106220 A1 | 4/2021 | Abou Shousha et al. |
| 2021/0106221 A1* | 4/2021 | Yam .................. A61B 3/0041 |
| 2021/0112226 A1 | 4/2021 | Abou |
| 2021/0244271 A1 | 8/2021 | Lee |
| 2021/0315453 A1 | 10/2021 | Jeon |
| 2022/0014720 A1 | 1/2022 | Abou Shousha |

FOREIGN PATENT DOCUMENTS

| | | |
|---|---|---|
| JP | 2011-255045 A | 12/2011 |
| KR | 10-2020-0056540 A | 5/2020 |
| KR | 10-2020-0088630 A | 7/2020 |
| KR | 10-2232925 B1 | 3/2021 |
| WO | 2015/136375 A2 | 9/2015 |
| WO | 2020/198491 A1 | 10/2020 |

OTHER PUBLICATIONS

Yow, A.P. et al.; "Automatic Detection of Preferred Retinal Locus (PRL) for Low Vision Rehabilitation using Oculometrics Analysis"; 2018 40th Annual International Conference of the IEEE Engineering in Medicine and Biology Society (EMBC); Jul. 18-21, 2018; total 2 pages; IEEE; XP033429440; DOI: 10.1109/EMBC.2018. 8513394; Hawaii, USA; URL: https://ieeexplore.ieee.org/document/8513394.

"Notice of Reasons for Refusal" Office Action issued in JP 2024-514376; mailed by the Japanese Patent Office on Feb. 4, 2025.

Extended European Search Report issued in EP 22 86 5047.9-1122 by the European Patent Office on Feb. 7, 2025, which is related to U.S. Appl. No. 18/594,271.

* cited by examiner

APPARATUS, METHOD, AND PROGRAM FOR SEARCHING AND TRAINING PREFERRED RETINAL LOCUS OF PATIENT WITH VISUAL FIELD DAMAGE

CROSS-REFERENCE TO RELATED APPLICATIONS

The present application is a continuation of International Patent Application No. PCT/KR2022/013047, filed on Aug. 31, 2022, which is based upon and claims the benefit of priority to Korean Patent Application No. 10-2021-0118306 filed on Sep. 6, 2021. The disclosures of the above-listed applications are hereby incorporated by reference herein in their entirety.

BACKGROUND

Embodiments of the present disclosure described herein relate to an apparatus, a method, and a program for searching and training a preferred retinal locus of a patient with a visual field damage.

A patient with a damaged field of view secures a field of view by using a peripheral vision of the damaged field of view, and thus, it is important to identify an area of the peripheral vision used by the patient and provide constant stimuli and reinforce the peripheral vision of the patient.

Accordingly, conventionally, a preferred retinal locus (PRL) of the patient may be identified through a professional measurement method, such as microperimetry, but the patient cannot directly identify his or her preferred retinal locus because a diagnosis by a professional medical staff is essential.

Furthermore, a method of reinforcing a peripheral vision through eccentric viewing training of the patient with a visual field damage is being used, but when the peripheral vision reinforced through training is not the preferred retinal locus of the patient, the reinforced peripheral vision cannot be used in daily life whereby an efficiency of treatment deteriorates.

Accordingly, it is necessary to accurately measure the preferred retinal locus of the patient with a visual field damage and enhance an efficiency of reinforcing the peripheral vision of the patient by reinforcing a preferred retinal area that is mainly used by the patient.

SUMMARY

Embodiments of the present disclosure provide an apparatus, a method, and a program for searching and training a preferred retinal locus of a patient with a visual field damage.

The problems that the present disclosure seeks to solve are not limited to the problems mentioned above, and other problems not mentioned may be clearly understood by an ordinary person in the art from the description below.

According to an aspect of the present disclosure, a method for searching a preferred retinal locus of a visual field damage of a patient, the method being performed by an apparatus, includes providing a first stimulus to the patient through a stimulus providing device interworking with the apparatus, receiving a response to the first stimulus from the patient through the stimulus providing device, analyzing a motion of a head of the patient, which corresponds to the first stimulus, when the response is a correct answer, and specifying the preferred retinal locus based on an analysis result, and the preferred retinal locus is set as a target for training of at least one of an eyesight and a visual cognitive ability of the patient and is provided with a second stimulus.

In the present disclosure, the analyzing may include analyzing a position of the head, which is changed due to the motion of the head from an initial position of the head of the patient with two-dimensional coordinates, and the initial position may be a position of the head in a state, in which a gaze of the patient is fixed to a center of a screen of the stimulus providing device, by using two lines intersecting a center of the screen.

In the present disclosure, the providing may include repeatedly providing the first stimulus until a preset condition is satisfied, and the receiving of the response may include receiving a plurality of responses to a plurality of repeatedly provided first stimulus.

In the present disclosure, the analyzing may include classifying, among the plurality of responses, only a response being the correct answer as one or more clusters, and predicting the retinal locus of the patient based on a result, in which the response is classified as the one or more clusters.

In the present disclosure, the specifying may include specifying the preferred retinal locus of the patient through a principal component analysis for the one or more clusters.

In the present disclosure, the first stimulus may include a behavioral task of requiring a determination on whether an orientation displayed at a center of the screen is transverse or longitudinal, and the second stimulus may include a training task using a target stimulus and a peripheral stimulus of a collinear array provided to the preferred retinal locus of the patient.

According to an aspect of the present disclosure, a method for training a preferred retinal locus of a visual field damage of a patient, the method being performed by an apparatus, includes performing training related to a central fixation of the patient, and performing training related to reinforcement of the preferred retinal locus of the patient, and the preferred retinal locus may be specified through a search scheme of analyzing a motion of a head of the patient due to a first stimulus provided to the patient through a stimulus providing device.

In the present disclosure, the performing of the training related to the central fixation may include displaying a visual queue crossing a field of view of the patient through the stimulus providing device, and requiring the patient to gaze at a point being predicted as an intersection of the visual queue.

In the present disclosure, the performing of the training related to the reinforcement of the preferred retinal locus may include providing a second stimulus to the preferred retinal locus through the stimulus providing device, and requiring the patient to search the second stimulus.

In the present disclosure, the first stimulus may include a behavioral task of requiring a determination on whether an orientation displayed at a center of the screen is transverse or longitudinal, and the second stimulus may include a training task using a target stimulus and a peripheral stimulus of a collinear array provided to the preferred retinal locus.

According to an aspect of the present disclosure, a method for searching and training a preferred retinal locus of a visual field damage of a patient, the method being performed by an apparatus, includes providing a first stimulus to the patient through a stimulus providing device interworking with the apparatus, receiving a response to the first stimulus from the patient through the stimulus providing device, analyzing a motion of a head of the patient, which corresponds to the first stimulus, when the response is a correct answer, specifying the preferred retinal locus based on an analysis result, performing training related to a central fixation of the patient, and performing training related to reinforcement of a preferred retinal locus of the patient.

In addition, another method for implementing the present disclosure, another system, and a computer-readable recording medium for recording a computer program for executing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The advantages and features of the present disclosure, and a method for achieving them will become clear with reference to the embodiments that will be described in detail together with the accompanying drawings. However, the present disclosure is not limited by the embodiments disclosed hereinafter but may be implemented in various different forms, and the embodiments are provided simply to make the disclosure of the present disclosure complete and inform an ordinary person in the art of the scope of the present disclosure, and the disclosure is only defined by the scope of the claims.

The terms used in the specification is for describing the embodiments, and is not intended to limit the present disclosure. A singular expression includes a plural expression unless an exemption is particularly described in the specification. The expression "comprises" and/or "comprising" used in the specification does not exclude presence or addition of one or more other components, in addition to the mentioned components. Throughout the specification, the same reference numerals denote the same components, and the term "and/or" includes one or more combinations of the mentioned components. Although "first", "second", or the like is used to describe various components, it is apparent that the components are not limited by the terns. The terms are used simply to distinguish one component from another component. Accordingly, it is apparent that a first component mentioned hereinafter may be a second component in the technical spirit of the present disclosure.

Unless otherwise defined, all terms (including technical and scientific terms) used herein have the same meaning as commonly understood by those skilled in the art, to which the present disclosure pertains. Furthermore, the terms defined in commonly used dictionaries should not be interpreted in an idealized or overly formal sense unless expressly so defined herein.

Hereinafter, embodiments of the present disclosure will be described in detail with reference to the attached drawings.

Prior to description, the meaning of terms used in this specification will be briefly described. However, because the description of terms is intended to aid understanding of this specification, it should be noted that it is not used in the sense of limiting the technical idea of the present disclosure when it is not explicitly stated as limiting the present disclosure.

The present disclosure aims to improve at least one of an eyesight and a visual cognitive ability of a patient with a visual field damage by searching and training a preferred retinal locus, and the present disclosure may be applied to digital therapeutics by a treatment effect of searching and training the preferred retinal locus.

Digital therapeutics refer to digital healthcare that is used along with a surgery, a surgical procedure, or a medicine for treating patients. The digital therapeutics use software such as applications, games, VR, chatbots, and artificial intelligence, and the software alone may serve as a therapeutic agent, or software embedded in a hardware medical device may serve as a therapeutic agent.

In this specification, 'a computer' includes all various devices capable of performing computational processing. For example, computers include not only desktop PCs and laptops (notebooks), but also smart phones, tablet PCs, cellular phones, personal communication service (PCS) phones, synchronous/asynchronous (international mobile telecommunication-2000) IMT-2000 mobile terminals, palm personal computers (palm PCs), and personal digital assistants (PDAs). Furthermore, a computer may include head-mounted display functionality, and also includes a head-mounted display device that is itself a computing device. As a computing device, in which a computer is connected to a head mounted display device by wire or wirelessly, and the computer includes the computing device that providing images to the head mounted display device. The computer includes a head-mounted display computing device that itself generates and provides images. Furthermore, the computer may be a server computer that receives information from a client. Hereinafter, in the specification, a computer may be expressed as a device, a terminal, or a client.

In the specification, 'a head mounted display device' refers to a device that provides images (stimuli) for searching and training a preferred retinal locus to the eyes of a user (patient). The present disclosure is a method for searching and training a preferred retinal locus, which is performed in 2D and 3D (virtual reality, VR), and when performed in 3D, a 'head mounted display device' is used. A 'head mounted display device' may be a device that is used while being connected to a computer (e.g., a PC or a smartphone) or a device including a computing function.

In the specification, a 'screen' that is provided to the user (patient) includes a separate display screen when training is performed in two dimensions, and includes a screen on the head mounted display device worn by the user when training is performed in three dimensions.

In this specification, a 'device' includes all various devices that may perform computational processing and provide results to the user. For example, the device may be in the form of a computer or a mobile terminal. The computer may be in the form of a server that receives requests from clients and performs information processing. Furthermore, a computer may include a sequencing device that performs sequencing. The mobile terminal may include mobile phones, smart phones, personal digital assistants (PDAs), portable multimedia players (PMPs), navigation devices, laptop PCs, slate PCs, tablet PCs, and ultrabooks, or wearable devices (for example, a watch-type terminal (smartwatch), a glass-type terminal (smart glass), a head mounted display (HMD)).

In the specification, a 'stimulus providing device' may be a display device in the form of a monitor that provides stimuli in a 2D form to a patient with a visual field damage, or may be a virtual reality device (EX, HMD, or GLASS) that is worn by a patient with a visual field damage to provide 3D stimuli based on virtual reality (AR, VR, or XR).

In the specification, a 'patient with a visual field damage' may include all patients who are unable to perceive objects in a normal way due to damage or loss of at least one of an eyesight and a visual cognitive ability for a specific area of an entire field of view. For example, this may include patients with macular degeneration or glaucoma who have lost a central vision and cannot see the central field of view and thus have to perceive objects through a peripheral vision.

In the specification, a 'stimulus' may mean a visual stimulus (gabor) that is provided to the patient with a visual field damage. Through various types of visual stimuli, the preferred retinal locus of a patient with a visual field damage may be searched and the found preferred retinal locus may be trained. The 'stimulus' may be in a two-dimensional or three-dimensional form.

Hereinafter, a method for searching a preferred retinal locus of a patient with a visual field damage will be described in detail with reference to FIGS. 1 to 5.

Figure 1:
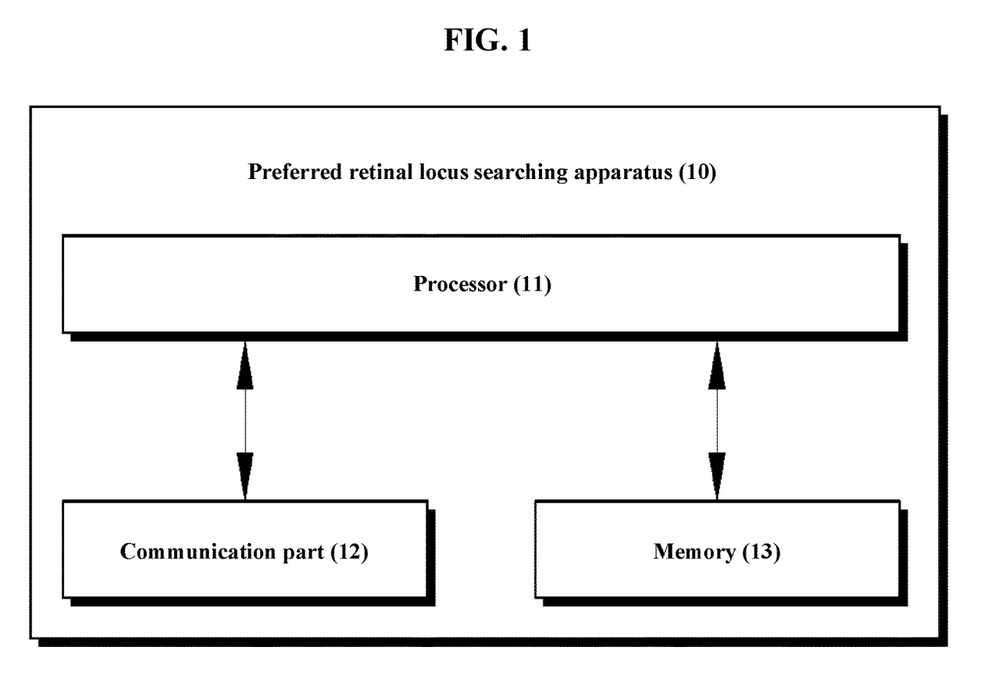
FIG. 1 is a block diagram of a preferred retinal locus searching apparatus for a patient with a visual field damage according to an embodiment of the present disclosure.

FIG. 1 is a block diagram of the preferred retinal locus searching apparatus for a patient with a visual field damage according to an embodiment of the present disclosure.

Figure 2:
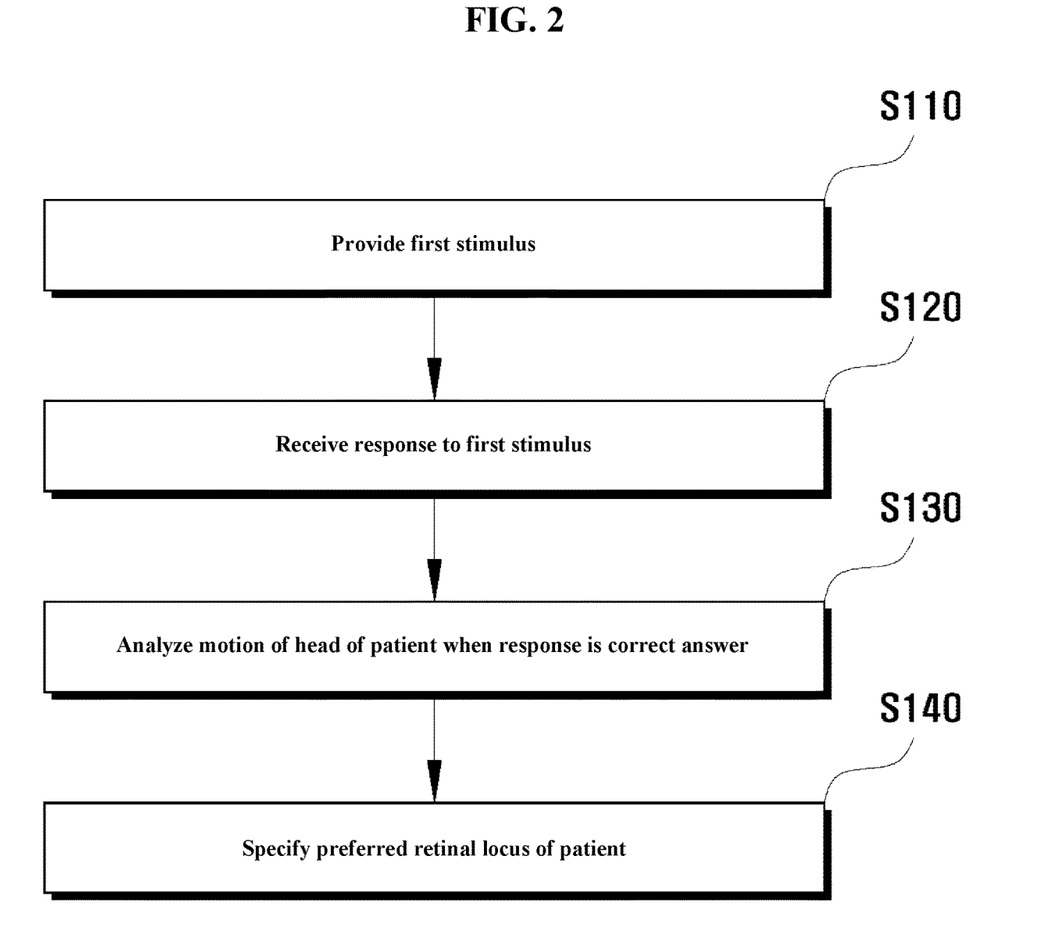
FIG. 2 is a flowchart of a preferred retinal locus searching method for a patient with a visual field damage according to an embodiment of the present disclosure.

FIG. 2 is a flowchart of a preferred retinal locus searching method for a patient with a visual field damage according to an embodiment of the present disclosure.

Figure 3:
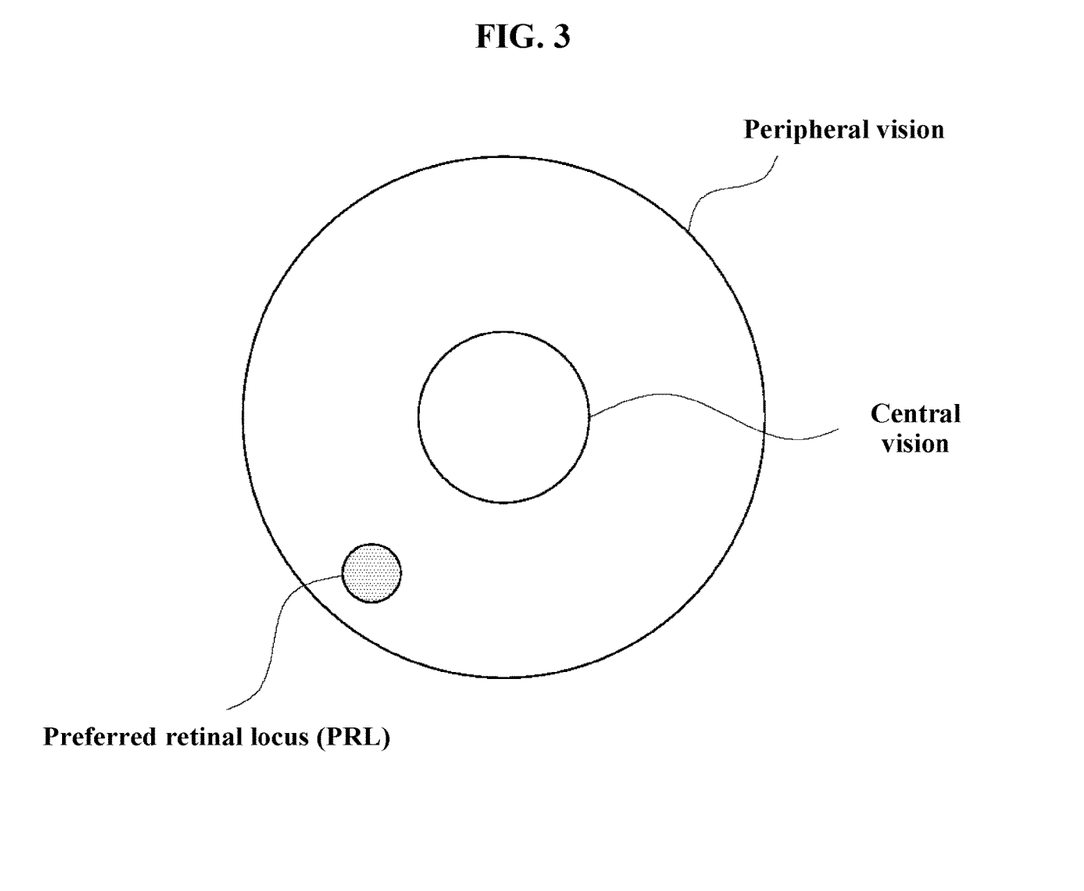
FIG. 3 is a view illustrating a preferred retinal locus of a patient with a visual field damage according to an embodiment of the present disclosure.

FIG. 3 is a view illustrating a preferred retinal locus of a patient with a visual field damage according to an embodiment of the present disclosure.

Figure 4:
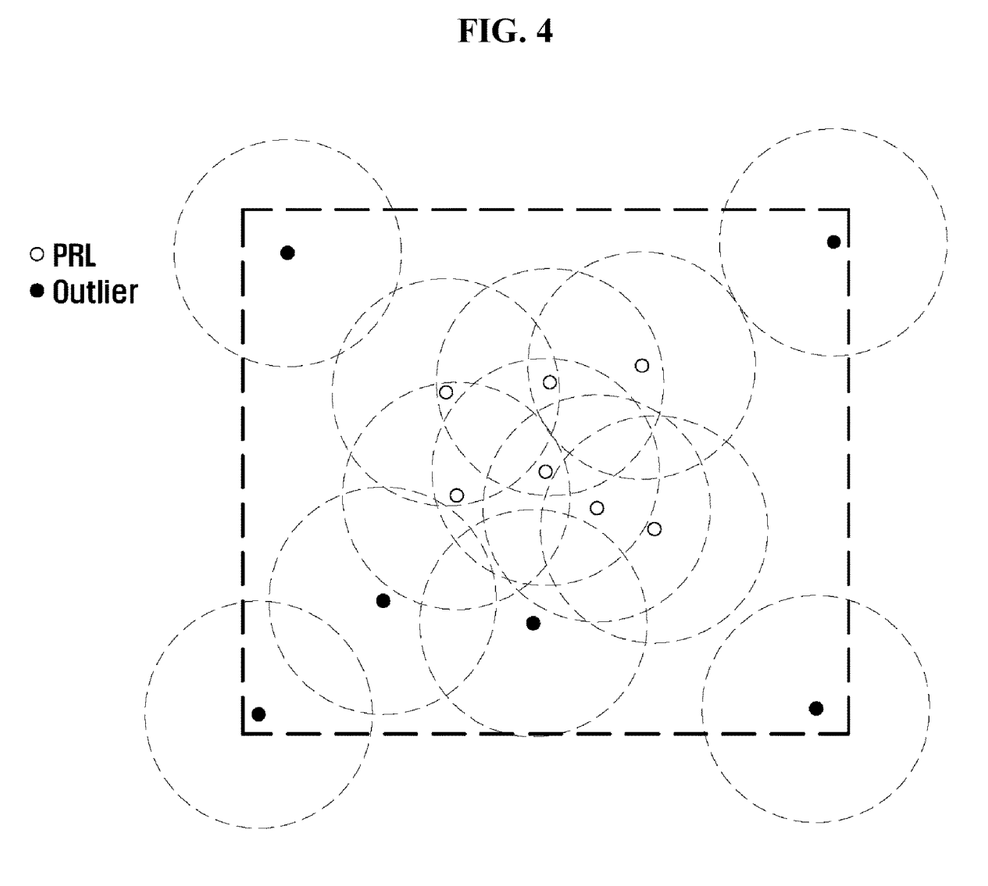
FIGS. 4 and 5 are views illustrating a method for analyzing two-dimensional coordinates depending on a motion of a head according to an embodiment of the present disclosure.
Figure 5:
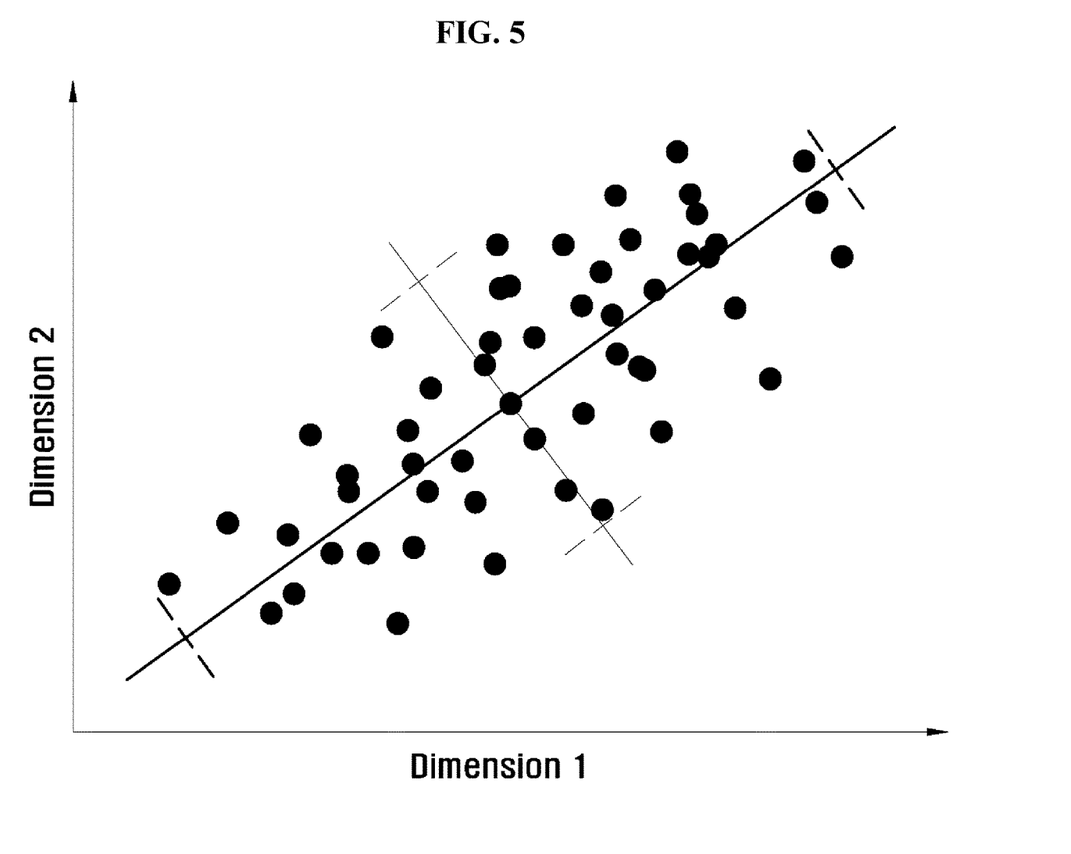

FIGS. 4 and 5 are views illustrating a method for analyzing two-dimensional coordinates according to head motion according to an embodiment of the present disclosure.

Referring to FIG. 1, a preferred retinal locus searching apparatus 10 (hereinafter referred to as a preferred retinal locus searching apparatus) for a patient with a visual field damage according to an embodiment of the present disclosure includes a processor 11, a communication part 12, and a memory 13.

However, in some embodiments, the preferred retinal locus searching apparatus 10 may include a smaller or larger number of components than those illustrated in FIG. 1.

For example, the preferred retinal locus searching apparatus 10 may further include an input/output part that receives various control signals from the user/administrator of the apparatus and outputs the results.

The communication part 12 may provide a stimulus to the patient with a visual field damage through the stimulus providing device, and receive a response to the stimulus from the patient with a visual field damage through the stimulus providing device.

The patient with a visual field damage may use (in more detail, wear) the stimulus providing device to identify the stimulus that is displayed on the screen, and may input a response to the stimulus.

The memory 13 stores the response to the stimulus, which is acquired through the communication part 12, and the results of performance of the preferred retinal locus searching method for the patient with a visual field damage.

In addition, the memory 13 stores various commands, algorithms, and the like to execute the preferred retinal locus searching method for the patient with a visual field damage.

The processor 11 controls the components in the preferred retinal locus searching apparatus 10.

The preferred retinal locus searching apparatus 10 according to an embodiment of the present disclosure may include a computer and an information processing device, and may preferably include a preferred retinal locus search server.

Below, a detailed description of a method for searching the preferred retinal locus of the patient with a visual field damage by the preferred retinal locus searching apparatus 10 according to an embodiment of the present disclosure will be made with reference to FIG. 2.

The preferred retinal locus searching apparatus 10 may provide a first stimulus to the patient with a visual field damage through the stimulus providing device that interworks with the apparatus 10 through the communication part 12 (S110).

The preferred retinal locus searching apparatus 10 may receive a response to the first stimulus from the patient with a visual field damage through the stimulus providing device through the communication part 12 (S120).

When the response is a correct answer, the processor 11 of the preferred retinal locus searching apparatus 10 may analyze a motion of the head of the patient with a visual field damage corresponding to the first stimulus (S130).

The processor 11 of the preferred retinal locus searching apparatus 10 may specify the preferred retinal locus based on the analysis result (S140).

Here, the stimulus providing device and the preferred retinal locus searching apparatus 10 may be implemented as individual devices that are connected to each other by wire or wirelessly, or the stimulus providing device and the preferred retinal locus searching apparatus 10 may be implemented as an integrated device.

Here, the first stimulus may include a behavioral task that requires a determination on whether an orientation displayed at a center of a screen of the stimulus providing device is horizontal or vertical. However, the first stimulus is not limited thereto and may be provided in various forms as a behavioral task for searching the preferred retinal locus of the patient with a visual field damage.

In more detail, the first stimulus may be a behavioral task for finding the first stimulus presented to the dead center of the screen and determining whether the orientation is transverse or longitudinal, in a state, in which the eyes are fixed to the dead center of the screen by using two line segments that intersect the dead center of the screen of the stimulus providing device.

Referring to FIG. 3, in a patient with a visual field damage, the central vision is damaged and objects are recognized through the preferred retinal locus (PRL) at a specific position in the peripheral vision. Then, because the preferred retinal locus is different for each patient, it is important to accurately find where each patient's preferred retinal locus is located.

Because the patient with a visual field damage illustrates a damage to the central vision (absolute scotoma), his or her head is moved to find the first stimulus presented on the screen, and then, the preferred retinal locus of the corresponding patient may be specified by using a motion of the head.

In more detail, the processor 11 may analyze the position of the head, which is changed by the motion of the head, in two-dimensional coordinates from the initial position of the head of the patient with a visual field damage.

Here, the initial position may mean the position of the head when a gaze of the patient with a visual field damage is fixed to the center of the screen by using two lines that intersect the center of the screen of the stimulus providing device.

The processor 11 may convert the motion results of the head of the patient with a visual field damage into spatial coordinates by using a gyroscope that is embedded in the stimulus providing device, and may output the two-dimensional coordinate of the position that is reached after being rotated from the initial position.

Only when determining that the patient with a visual field damage has appropriately used the preferred retinal locus by using motion of the head (i.e., only when the response to the first stimulus is the correct answer), the processor 11 may use the motion of the head of the patient with a visual field damage when received for analysis.

In operation S110, the processor 11 may repeatedly provide the first stimulus until a preset condition is satisfied.

In operation S120, the processor 11 may receive a plurality of responses to the plurality of repeatedly provided first stimuli.

Here, the preset condition may be whether a minimum number of response data for data analysis has been collected or whether the number of times the first stimulus has been provided has reached a maximum number.

That is, the processor 11 may repeatedly provide the first stimulus to the patient with a visual field damage, and when the number of response data that is the correct answer received from the patient satisfies the minimum number, the processor 11 may end providing the first stimulus to the patient. Alternatively, the processor 11 may repeatedly provide the first stimulus to the patient with a visual field damage, and when the number of times the first stimulus has been provided to the patient satisfies the maximum number of times, the processor 11 may end providing the first stimulus to the patient.

In operation S130, the processor 11 may classify, among the plurality of responses, only the correct answer into one or more clusters, and based on the results of classification into the one or more clusters, may predict the preferred retinal locus of the patient with a visual field damage.

In operation S140, the processor 11 may specify the preferred retinal locus of the patient with a visual field damage through a principal component analysis of the one or more clusters.

The processor 11 may analyze the two-dimensional coordinate results of the motion at a time point, at which the patient responds with the correct answer, in real time by using density-based spatial clustering of applications with noise (DBSAN).

Referring to FIG. 4, the processor 11 may classify the two-dimensional coordinates into one or more clusters by an algorithm depending on whether they are spatially adjacent to each other, and the information that is not classified into a cluster may be classified as an outlier.

In this way, the area corresponding to the clustering result for the two-dimensional coordinates corresponds to the area of the predicted preferred retinal locus of the patient with a visual field damage, and in the patient with a visual field damage, in which one or more clusters are formed in a single form, the position of the locus is consistent (well-localized).

Referring to FIG. 5, the processor 11 may perform a principal component analysis (PCA) on the one cluster analyzed in operation S130, may extract a line segment (an eigenvalue or an eigenvector) that best represents the cluster from the principal component analysis, and may use the extracted line segment as an element of a training stimulus array that may show an optimal effect on the preferred retinal locus of the patient with a visual field damage, along with the two-dimensional coordinate average of the cluster.

In this way, the present disclosure may measure the motion of the head of the patient with a visual field damage corresponding to the visual stimulus (the first stimulus) provided by the stimulus providing device by using a gyroscope, and may specify the preferred retinal locus (PRL) of the patient with a visual field damage by analyzing the motion of the patient with a visual field damage depending on the stimulus.

The preferred retinal locus specified in this way may be set as a target for training at least one of an eyesight and a visual cognitive ability of the patient with a visual field damage and may be provided as the second stimulus. Here, the second stimulus may include a training task using the target stimulus and the peripheral stimulus of the collinear array provided to the preferred retinal locus of the patient with a visual field damage. A detailed description thereof will be provided later.

Figure 7:
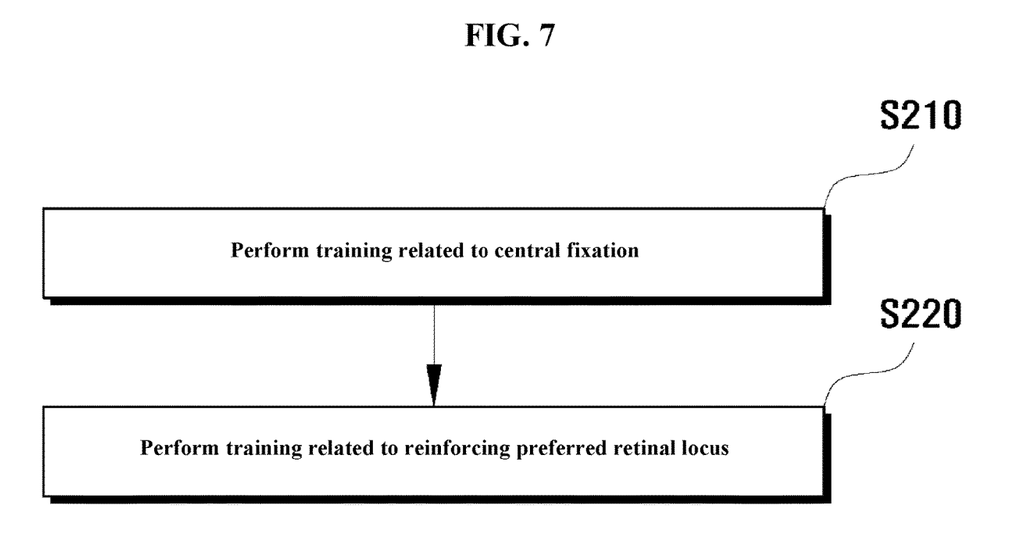
FIG. 7 is a flowchart of a preferred retinal locus training method for a patient with a visual field damage according to an embodiment of the present disclosure.

That is, the operations of operations S210 and S220, which will be described later, may be performed by using the preferred retinal locus that is specified through operations S110 to S140.

Hereinafter, a method of training the preferred retinal locus of a patient with a visual field damage will be described in detail with reference to FIGS. 6 to 8.

Figure 6:
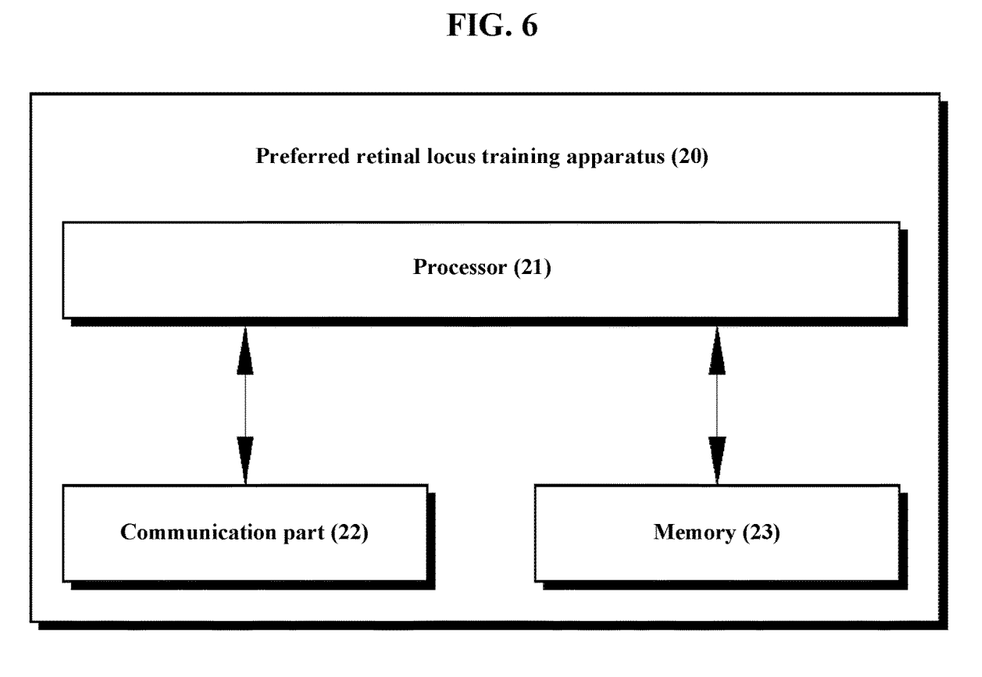
FIG. 6 is a block diagram of a preferred retinal locus training apparatus for a patient with a visual field damage according to an embodiment of the present disclosure.

FIG. 6 is a block diagram of the preferred retinal locus training apparatus for a patient with a visual field damage according to an embodiment of the present disclosure.

FIG. 7 is a flowchart of the preferred retinal locus training method for a patient with a visual field damage according to an embodiment of the present disclosure.

Figure 8:
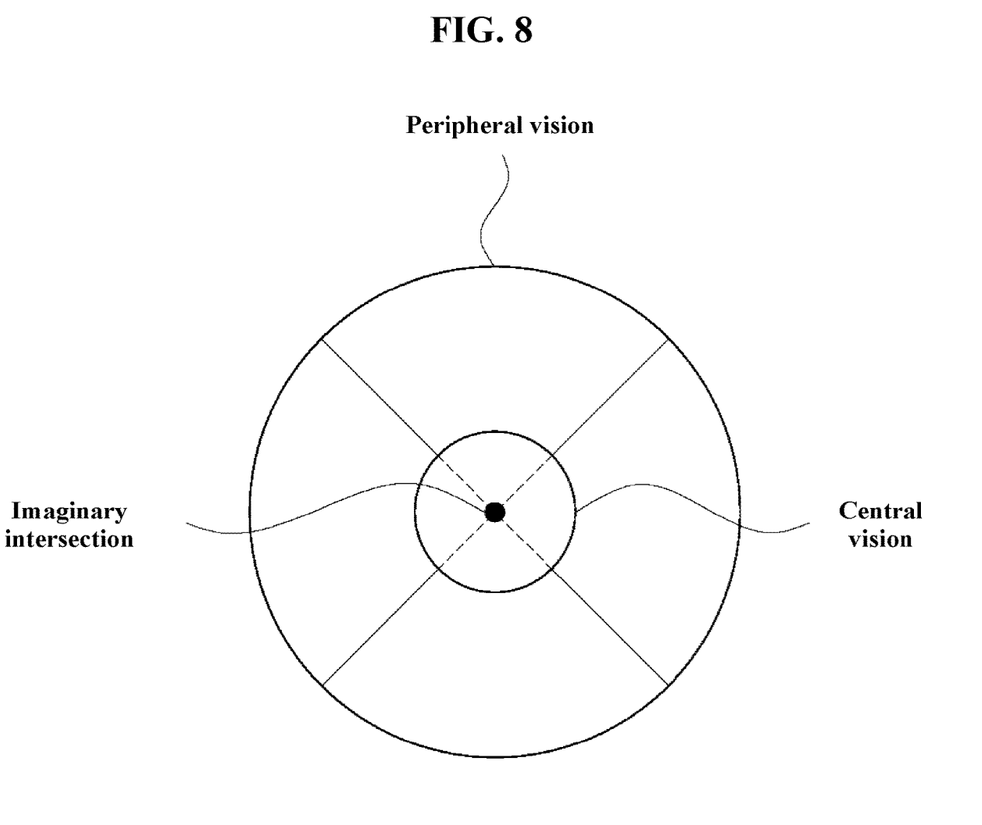
FIG. 8 is a view illustrating central fixation training according to an embodiment of the present disclosure.

FIG. 8 is a view illustrating central fixation training according to an embodiment of the present disclosure.

Referring to FIG. 6, a preferred retinal locus training apparatus 20 (hereinafter, a preferred retinal locus training apparatus) for a patient with a visual field damage according to the embodiment of the present disclosure includes a processor 21, a communication part 22, and a memory 23.

However, in some embodiments, the preferred retinal locus training apparatus 20 may include a smaller or larger number of components than those illustrated in FIG. 6.

For example, the preferred retinal locus training apparatus 20 may further include an input/output part that receives various control signals from the user/administrator of the apparatus and outputs the results.

The communication part 22 may provide a stimulus to the patient with a visual field damage through the stimulus providing device, and may receive a response to the stimulus from the patient with a visual field damage through the stimulus providing device.

The patient with a visual field damage may use (in more detail, wear) the stimulus providing device to identify the stimulus displayed on the screen and input a response to the stimulus.

The memory 23 stores the response to the stimulus acquired through the communication part 22 and the results of performing the preferred retinal locus training method for the patient with a visual field damage.

In addition, the memory 23 stores various commands, algorithms, and the like for executing the preferred retinal locus training method for the patient with a visual field damage.

The processor 21 controls the configurations in the preferred retinal locus training apparatus 20.

The preferred retinal locus training apparatus 20 according to an embodiment of the present disclosure may include a computer and an information processing device, and may preferably include a preferred retinal locus training server.

Hereinafter, a method for training the preferred retinal locus of the patient with a visual field damage by the preferred retinal locus training apparatus 20 according to the embodiment of the present disclosure will be described with reference to FIG. 7.

The processor 21 of the preferred retinal locus training apparatus 20 may perform training related to a central fixation of the patient with a visual field damage (S210).

The processor 21 of the preferred retinal locus training apparatus 20 may perform training related to reinforcing the preferred retinal locus of the patient with a visual field damage (S220).

Here, the preferred retinal locus may be specified by a search scheme of analyzing a motion of the head of the patient with visual field damage due to the first stimulus provided to the patient with a visual field damage through the stimulus providing device that interworks with the apparatus. Here, the first stimulus may include a behavioral task that requires a determination on whether an orientation displayed at the center of the screen of the stimulus providing device is transverse or longitudinal. A detailed description thereof will be omitted as it overlaps the above description.

As described above, the patient with a visual field damage look off-center through his or her preferred retinal locus (PRL), and this requires the patient to turn his or her head to look and may cause the patient to feel the discomfort of having to pay attention to other people's gazes. Accordingly, by developing the preferred retinal locus specified through operations S110 to S140 through training in operations S210 and S220, the patient may recognize an object with a peripheral vision.

In more detail, in operation S210, the processor 21 may display a visual queue that crosses the field of view of the patient with a visual field damage through the stimulus providing device, and may require the patient with a visual field damage to gaze at a point that is predicted as an intersection of the queue.

Referring to FIG. 8, for the central fixation of the patient with a damaged field of view, the patient may gaze at the point that is predicted as the intersection of the visual queue when a virtual visual queue that crosses the field of view of the patient is provided through the stimulus providing device. This makes it possible to induce a central fixation of the patient.

Then, in operation S220, the processor 21 may provide a second stimulus to the preferred retinal locus through the stimulus providing device and may require the patient with a visual field damage to detect the second stimulus.

Here, the second stimulus may include a training task using the target stimulus and peripheral stimulus of the collinear array provided at the preferred retinal locus.

In more detail, the second stimulus is a temporal two alternative forced choice (temporal 2-AFC) task using the target stimulus and the peripheral stimuli of the collinear array provided at the preferred retinal locus of the patient with a visual field damage, and may respond to the number of the screen that is presented together with the target stimulus positioned at the center of the array.

Here, a collinear array may refer to a stimulus array, in which an angle defined by the target stimulus and the peripheral stimulus, which are arranged in a row, and an angle in the second stimulus are the same.

The stimuli in the collinear array may be characterized by an outward lateral interaction, in which a detection of the target stimulus is difficult when the distance between stimuli is close, and a detection of the target stimulus is easy when the distance between stimuli is long, and may be understood as a result of a magnitude of a human receptive field.

Systematic manipulation of an inter-stimulus distance ($\lambda$) and a spatial frequency ($\sigma$) of the second stimulus provided for training may ultimately change the magnitude of the receptive field and increase a transferability of a visual perceptual learning effect. Transfer means that after training, the effect goes beyond the detection/discrimination sensitivity of the second stimulus and affects higher level visual processing (e.g. reading ability), and a poor reading ability characterized by the poor peripheral vision of the patient with a visual field damage may be improved after training.

In this way, the present disclosure continues to provide the second stimulus that may reinforce the preferred retinal locus of the patient with a visual field damage while inducing a central fixation whereby continuous stimuli in a specific part of the peripheral vision of the patient may be induced to develop the preferred retinal locus. Through this, it is possible to reinforce the peripheral vision which the patients may use in real life, and increase an efficiency of treatment.

In the above, although the stimulus providing device that provides the first stimulus and the stimulus providing device that provides the second stimulus have been described as being the same, the two devices may be different depending on embodiments. In other words, the stimulus providing device that provides the first stimulus may be connected to the preferred retinal locus searching apparatus 10 when the preferred retinal locus searching apparatus 10 performs the preferred retinal locus searching method to transmit and receive various data, signals, and information, and the stimulus providing device that provides the second stimulus may be connected to the preferred retinal locus training apparatus 20 when the preferred retinal locus searching apparatus 10 performs the preferred retinal locus training method to transmit and receive various data, signals and information. Furthermore, the preferred retinal locus search result of performing the preferred retinal locus searching method may be transmitted and received between the preferred retinal locus searching apparatus 10 and the preferred retinal locus training apparatus 20.

Hereinafter, a method of searching and training the preferred retinal locus of a patient with a visual field damage will be described in detail with reference to FIGS. 9 and 10.

Figure 9:
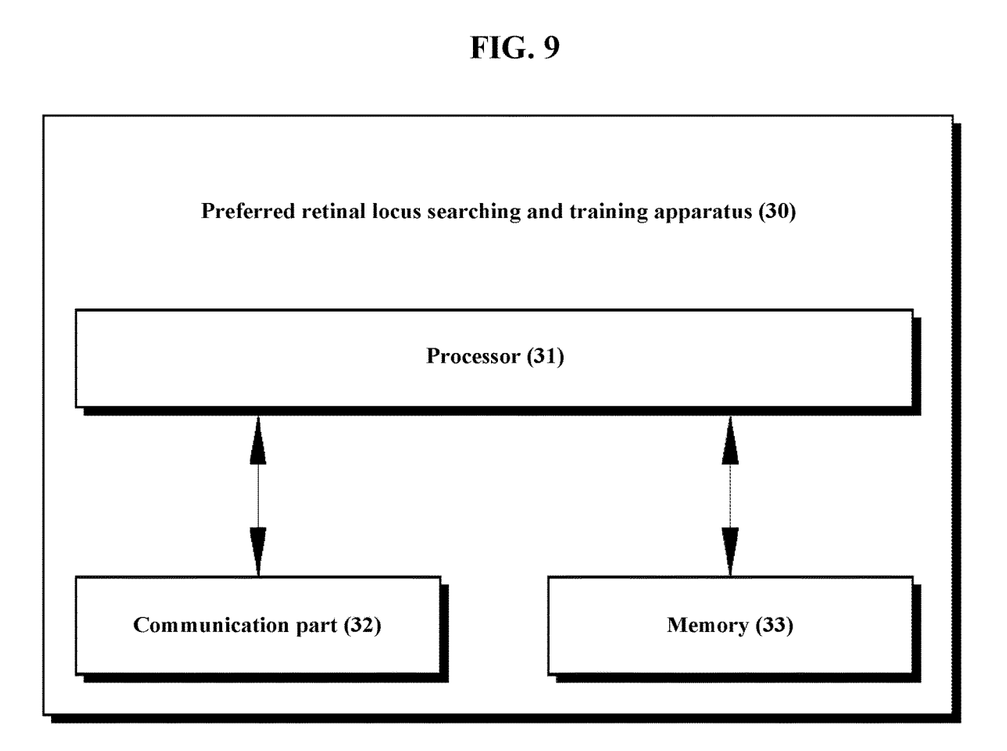
FIG. 9 is a block diagram of a preferred retinal locus searching and training apparatus for a patient with a visual field damage according to an embodiment of the present disclosure.

FIG. 9 is a block diagram of a preferred retinal locus searching and training apparatus for a patient with a visual field damage according to an embodiment of the present disclosure.

Figure 10:
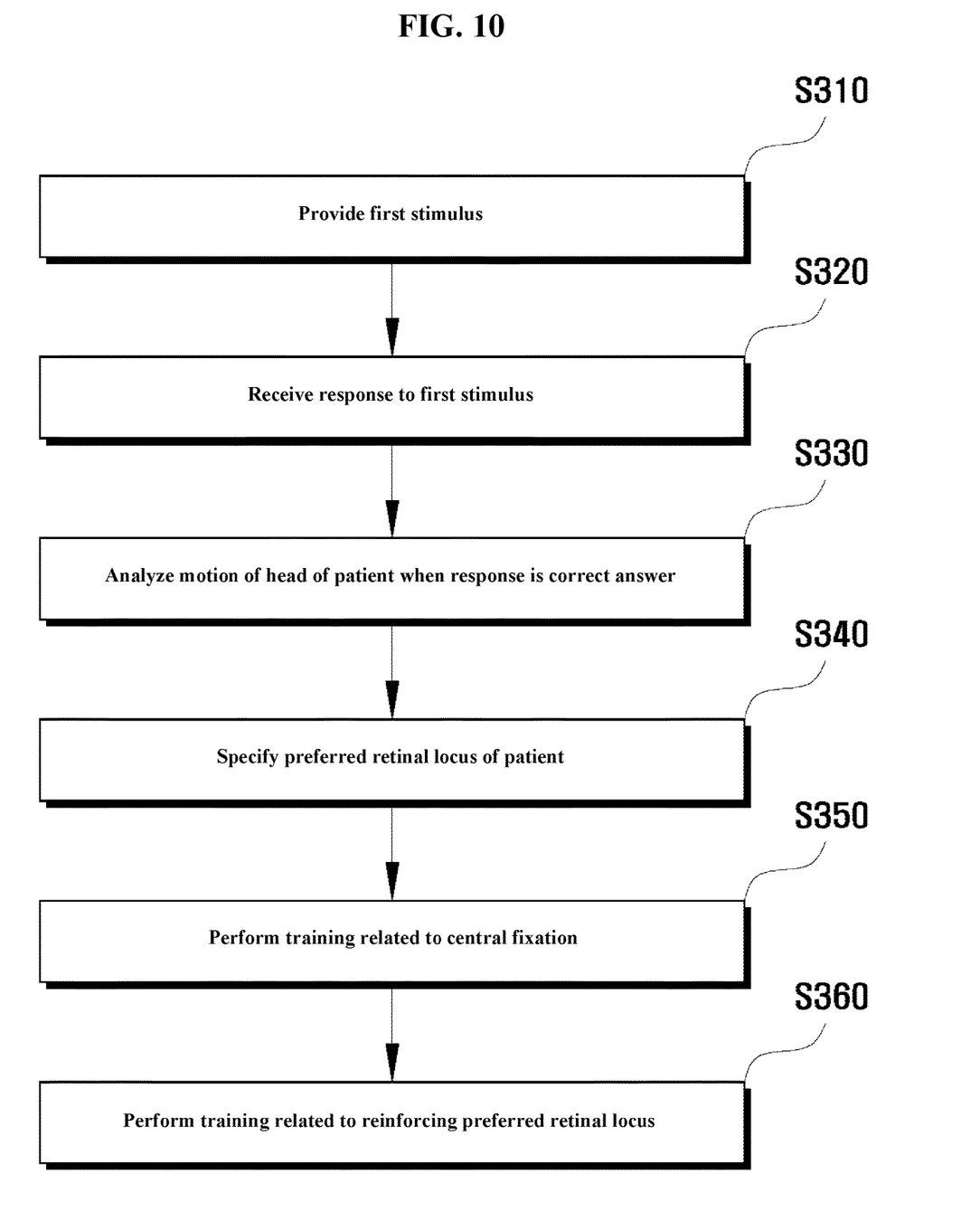
FIG. 10 is a flowchart of a preferred retinal locus searching and training method for a patient with a visual field damage according to an embodiment of the present disclosure.

FIG. 10 is a flowchart of a preferred retinal locus searching and training method for a patient with a visual field damage according to an embodiment of the present disclosure.

Referring to FIG. 9, a preferred retinal locus searching and training apparatus 30 (hereinafter, a preferred retinal locus searching and training apparatus) of a patient with a visual field damage according to an embodiment of the present disclosure includes a processor 31, a communication part 32, and a memory 33.

However, in some embodiments, the preferred retinal locus searching and training apparatus 30 may include a smaller or larger number of components than those illustrated in FIG. 9.

For example, the preferred retinal locus searching and training apparatus 30 may further include an input/output part that receives various control signals from the user/administrator of the device and outputs the results.

The communication part 32 may provide a stimulus to the patient with a visual field damage through the stimulus providing device, and may receive a response to the stimulus from the patient with a visual field damage through the stimulus providing device.

The patient with a visual field damage may identify a stimulus displayed on the screen and input a response to the stimulus by using (in more detail, wearing) the stimulus providing device.

The memory 33 stores the response to the stimulus acquired through the communication part 32 and the results of performing the preferred retinal locus searching and training method for the patient with a visual field damage.

In addition, the memory 33 stores various commands, algorithms, and the like for executing the preferred retinal locus searching and training method for the patient with a visual field damage.

The processor 31 controls the components in the preferred retinal locus searching and training apparatus 30.

The preferred retinal locus searching and training apparatus 30 according to the embodiment of the present disclosure may be a computer and an information processing device, and may preferably include a preferred retinal locus searching and training server.

Hereinafter, a method for searching and training the preferred retinal locus of a patient with a visual field damage by the preferred retinal locus searching and training apparatus 30 according to an embodiment of the present disclosure will be described in detail with reference to FIG. 10.

The preferred retinal locus searching and training apparatus 30 may provide a first stimulus to the patient with a visual field damage through the stimulus providing device that interworks with the apparatus 30 through the communication part 32. (S310).

The preferred retinal locus searching and training apparatus 30 may receive a response to the first stimulus from the patient with a visual field damage through the stimulus providing device, through the communication part 32 (S320).

When the response is a correct answer, the processor 31 of the preferred retinal locus searching and training apparatus 30 may analyze the motion of the head of the patient with a visual field damage corresponding to the first stimulus (S330).

The processor 31 of the preferred retinal locus searching and training apparatus 30 may specify the preferred retinal locus based on the analyzed results (S340).

The processor 31 of the preferred retinal locus searching and training apparatus 30 may perform training related to a central fixation of the patient with a visual field damage (S350).

The processor 31 of the preferred retinal locus searching and training apparatus 30 may perform training related to reinforcing the preferred retinal locus of the patient with a visual field damage (S360).

Here, operations S310 to S340 are the same as operations S110 to S140 described above with reference to FIGS. 1 to 5, and operations S350 and S360 are the same as operations S210 and S220 described above with reference to FIGS. 6 to 8, and thus, a detailed description of operations S310 to S360 will be omitted.

That is, the preferred retinal locus searching and training apparatus 30 may perform the roles of both the preferred retinal locus searching apparatus 10 and the preferred retinal locus training apparatus 20. Then, the stimulus providing device providing the first stimulus and the stimulus providing device providing the second stimulus may be the same.

The method according to an embodiment of the present disclosure described above may be implemented as a program (or application) and may be stored in a medium to be executed in combination with a server, which is hardware. Here, the server may be at least one of the previously described preferred retinal locus search server, the preferred retinal locus training server, and the preferred retinal locus searching and training server.

The above-mentioned program may include a code encoded by a computer language, such as C, C++, JAVA, a machine language, and the like that may be read by a processor (CPU) of a computer through a device interface of the computer for the computer to read the program and execute methods implemented in the program. It may include a functional code related to functions that define functions that are necessary the methods, and may include control codes related to execution procedures that are necessary for a processor of the computer to execute the functions according to specific procedures. In addition, these codes may further include memory reference-related codes that indicate at which location (address address) in an internal or external memory of the computer additional information or media required for the processor of the computer to execute the above functions have to be referenced. In addition, when the processor of the computer needs to communicate with any other remote computer or server to execute the above functions, the code may further include a communication-related code regarding whether how to communicate with any other remote computer or server and what information or media have to be transmitted and received during communication by using a communication module of the computer.

The storage medium refers to a medium that stores data semi-permanently and may be read by the device, rather than a medium that stores data for a short period of time, such as a register, a cache, or a memory. In detail, examples of the storage medium include a ROM, a RAM, a CD-ROM, a magnetic tape, a floppy disk, and an optical data storage device, but the present disclosure is not limited thereto. That is, the program may be stored in various recording media on various servers that the computer may access or on various recording media on a computer of the user. Additionally, the medium may be distributed to computer systems connected to a network, and computer-readable codes may be stored in a distributed manner.

Meanwhile, the operations of the method or algorithm described in relation to the embodiment of the present disclosure may be implemented directly in hardware, implemented as a software module executed by hardware, or a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any type of computer-readable recording medium well known in the art, to which the present disclosure pertains.

According to the present disclosure above, a preferred retinal locus of a patient with a damaged field of view may be identified only by a behavioral task provided through a stimulus providing device without a diagnostic procedure by a professional medical staff.

Furthermore, by inducing a central fixation of the patient, a preferred retinal locus may be developed by inducing continuous stimuli of a specific part of a peripheral vision.

Additionally, by reinforcing the preferred retinal locus of the patient, the peripheral vision that may be used in the real life of the patient may be reinforced and an efficiency of treatment may be increased.

The effects of the present disclosure are not limited to the effects mentioned above, and other effects not mentioned may be clearly understood by an ordinary person in the art from the description below.

Until now, the embodiments of the present disclosure have been described with reference to the accompanying drawings, but it may be understood that an ordinary person in the art, to which the present disclosure pertains, may carry out the present disclosure in another specific form while not changing the technical spirit or the essential features. Therefore, it should be understood that the embodiments described above are all illustrative, and not restrictive.

What is claimed is:

1. A method for searching a preferred retinal locus of a visual field damage of a patient, the method being performed by an apparatus, the method comprising:
    providing a first stimulus to the patient through a stimulus providing device interworking with the apparatus;
    receiving a response to the first stimulus from the patient through the stimulus providing device;
    analyzing a motion of a head of the patient, which corresponds to the first stimulus, when the response is a correct answer; and
    specifying the preferred retinal locus based on an analysis result,
    wherein the preferred retinal locus is a specific area among a peripheral vision area of the patient, in which the patient recognizes an object and is set as a target for training of at least one of an eyesight and a visual cognitive ability of the patient, with a second stimulus being provided,
    wherein the first stimulus includes a behavioral task for finding the first stimulus presented to a dead center of a screen of the stimulus providing device and determining whether an orientation is transverse or longitudinal, in a state, in which eyes of the patient are fixed to the dead center of the screen by using two line segments that intersect the dead center of the screen of the stimulus providing device, to searching the preferred retinal locus, and
    wherein the second stimulus includes a training task provided, after the first stimulus, to the preferred retinal locus of the patient that recognizes the object, the training task is a temporal two alternative forced choice (temporal 2-AFC) task using a target stimulus and a peripheral stimulus of a collinear array provided at the preferred retinal locus of the patient, and requiring a response to a number of the screen that is presented together with the target stimulus positioned at a center of the collinear array.

2. The method of claim 1, wherein the providing includes:
    repeatedly providing the first stimulus until a preset condition is satisfied, and
    wherein the receiving of the response includes:
    receiving a plurality of responses to a plurality of repeatedly provided first stimulus.

3. The method of claim 2, wherein the analyzing includes:
    classifying, among the plurality of responses, only a response being the correct answer as one or more clusters, and predicting the preferred retinal locus of the patient based on a result, in which the response is classified as the one or more clusters.

4. The method of claim 3, wherein the specifying includes:
    specifying the preferred retinal locus of the patient through a principal component analysis for the one cluster.

5. A method for training a preferred retinal locus of a visual field damage of a patient, the method being performed by an apparatus, the method comprising:
    performing training related to a central fixation of the patient; and
    performing training related to reinforcement of the preferred retinal locus of the patient,
    wherein the preferred retinal locus is a specific area among a peripheral vision area of the patient, in which the patient recognizes an object, is specified through a search scheme of analyzing a motion of a head of the patient due to a first stimulus provided to the patient through a screen of a stimulus providing device interworking with the apparatus, and is set as a target for training of at least one of a vision and a vision cognitive ability of the patient,
    wherein the first stimulus includes a behavioral task for finding the first stimulus presented to a dead center of the screen and determining whether an orientation is transverse or longitudinal, in a state, in which eyes of the patient are fixed to the dead center of the screen by using two line segments that intersect the dead center of the screen of the stimulus providing device, to search the preferred retinal locus,
    wherein the performing of the training related to the reinforcement of the preferred retinal locus includes requiring the patient to search for a second stimulus by providing the second stimulus to the preferred retinal locus that recognizes an object through the stimulus providing device, after the first stimulus, and
    wherein the second stimulus includes a training task provided, after the first stimulus, to the preferred retinal locus of the patient that recognizes the object, the training task is a temporal two alternative forced choice (temporal 2-AFC) task using a target stimulus and a peripheral stimulus of a collinear array provided at the preferred retinal locus of the patient, and requiring a response to a number of the screen that is presented together with the target stimulus positioned at a center of the collinear array.

6. The method of claim 5, wherein the performing of the training related to the central fixation includes:
   displaying a visual queue crossing a field of view of the patient through the stimulus providing device, and requiring the patient to gaze at a point being predicted as an intersection of the visual queue.

7. A method for searching and training a preferred retinal locus of a visual field damage of a patient, the method being performed by an apparatus, the method comprising:
   providing a first stimulus to the patient through a stimulus providing device interworking with the apparatus;
   receiving a response to the first stimulus from the patient through the stimulus providing device;
   analyzing a motion of a head of the patient, which corresponds to the first stimulus, when the response is a correct answer;
   specifying the preferred retinal locus based on the result of the analysis;
   performing training related to a central fixation of the patient; and
   performing training related to reinforcement of the preferred retinal locus of the patient,
   wherein the preferred retinal locus is a specific area among a peripheral vision area of the patient, in which the patient recognizes an object and is set as a target for training of at least one of an eyesight and a visual cognitive ability of the patient,
   wherein the first stimulus includes a behavioral task for finding the first stimulus presented to a dead center of a screen of the stimulus providing device and determining whether an orientation is transverse or longitudinal, in a state, in which eyes of the patient are fixed to the dead center of the screen by using two line segments that intersect the dead center of the screen of the stimulus providing device, to searching the preferred retinal locus,
   wherein the performing of the training related to the reinforcement of the preferred retinal locus includes requiring the patient to search for a second stimulus by providing the second stimulus to the preferred retinal locus that recognizes an object through the stimulus providing device, after the first stimulus, and
   wherein the second stimulus includes a training task provided, after the first stimulus, to the preferred retinal locus of the patient that recognizes the object, the training task is a temporal two alternative forced choice (temporal 2-AFC) task using a target stimulus and a peripheral stimulus of a collinear array provided at the preferred retinal locus of the patient, and requiring a response to a number of the screen that is presented together with the target stimulus positioned at a center of the collinear array.

* * * * *